(12) United States Patent
Ohnishi (10) Patent No.: US 7,715,298 B2
(45) Date of Patent: May 11, 2010

(54) OPTICAL PICKUP AND OPTICAL INFORMATION REPRODUCING APPARATUS USING SAME

(75) Inventor: Kunikazu Ohnishi, Yokosuka (JP)

(73) Assignee: Hitachi Media Electronics Co., Ltd., Oshu-shi (JP)

( * ) Notice: Subject to any disclaimer, the term of this patent is extended or adjusted under 35 U.S.C. 154(b) by 930 days.

(21) Appl. No.: 11/508,969

(22) Filed: Aug. 24, 2006

(65) Prior Publication Data
US 2007/0146892 A1 Jun. 28, 2007

(30) Foreign Application Priority Data
Dec. 26, 2005 (JP) .............................. 2005-371301

(51) Int. Cl.
*G11B 7/00* (2006.01)
(52) U.S. Cl. ..................... 369/112.02; 369/112.03; 369/44.32
(58) Field of Classification Search ........................ None
See application file for complete search history.

(56) References Cited

U.S. PATENT DOCUMENTS

2005/0083824 A1* 4/2005 Ogasawara ............ 369/112.02

FOREIGN PATENT DOCUMENTS

| JP | 09-128785 | 5/1997 |
|---|---|---|
| JP | 11-110802 | 4/1999 |
| JP | 2001-143309 | 5/2001 |
| JP | 2002-50068 | 2/2002 |
| JP | 2003-317298 | 11/2003 |
| JP | 2004-192719 | 7/2004 |
| JP | 2006-92708 | 4/2006 |
| JP | 2007-164907 | 6/2007 |
| WO | WO 2006/092968 | 9/2006 |

* cited by examiner

*Primary Examiner*—Muhammad N. Edun
(74) *Attorney, Agent, or Firm*—Antonelli, Terry, Stout & Kraus, LLP.

(57) ABSTRACT

An optical pickup module with enhanced aberration correctability is disclosed. This pickup includes more than two different types of laser light sources, an objective lens for collecting and focusing any one of the laser beams leaving the light sources onto an optical disc, and an aberration correction device of the liquid crystal (LC) type, which is disposed between the light sources and the objective lens. The aberration corrector has a surface on which multiple spaced-apart electrodes are patterned for enabling aberration correction relative to incident beams. The corrector controls the potential of a voltage being applied to each electrode in deference to incident beam properties and variations occurrable thereto, e.g., wavelength, effective beam diameter and relative incidence position offsets, thereby to optimally correct beam aberrations, such as coma aberration or wavefront aberration. An optical information reproduction apparatus using the pickup is also disclosed.

20 Claims, 4 Drawing Sheets

OPTICAL PICKUP AND OPTICAL INFORMATION REPRODUCING APPARATUS USING SAME

INCORPORATION BY REFERENCE

The present application claims priority from Japanese application JP2005-371301 filed on Dec. 26, 2005, the content of which is hereby incorporated by reference into this application.

BACKGROUND OF THE INVENTION

1. Field of the Invention

The present invention relates to an optical pickup module with aberration correctability and an optical information reproduction apparatus using the pickup.

2. Description of Related Art

A background art in this technical field is disclosed, for example, in JP-A-11-110802. This Japanese bulletin contains, as an objective of the invention disclosed therein, the recitation which reads as follows: "... provide an aberration correcting device capable of effectively correcting wave-surface aberration occurring due to the tilting of an optical axis while enabling miniaturization with simplified arrangement and an information reproducing apparatus having this aberration correction device." It also discloses in the context of a solving means that "transparent electrodes 10c and 10d which are divided into pattern electrodes 30a, 30b, 31a, 31b, 32 and 40a, 40b, 41a, 41b, 42 each having a shape corresponding to a distribution of wavefront aberrations are formed on the both surfaces of a liquid crystal layer capable of giving to a light beam passing therethrough a phase difference depending upon the molecule direction thereof, thereby controlling the polarity and the value of a voltage being applied to each pattern electrode in a way corresponding to a tilt angle in either a detected tangential direction or a radial direction to thereby change the phase difference of the pass-through light beam in units of liquid crystal regions as partitioned by respective pattern electrodes in such a way as to cancel out the presently occurring wavefront aberration. At this time, the voltage applied is inverted in its polarity to permit application of the necessary potential difference to a liquid crystal element."

A prior known example of the above-noted wavefront aberration correction device is designed so that transparent electrodes of prespecified shapes are disposed on the both surfaces of a liquid crystal (LC) element. In the aberration correction device using this LC element, each of the transparent electrodes which are disposed to interpose the LC element therebetween is driven to create a potential difference to thereby change the orientation of LC molecules and then locally vary the refractivity due to a difference in LC molecule orientation and thus give a local phase change to the light beam passing through this LC element for correction or "amendment" of the wavefront aberration.

Figure 2:
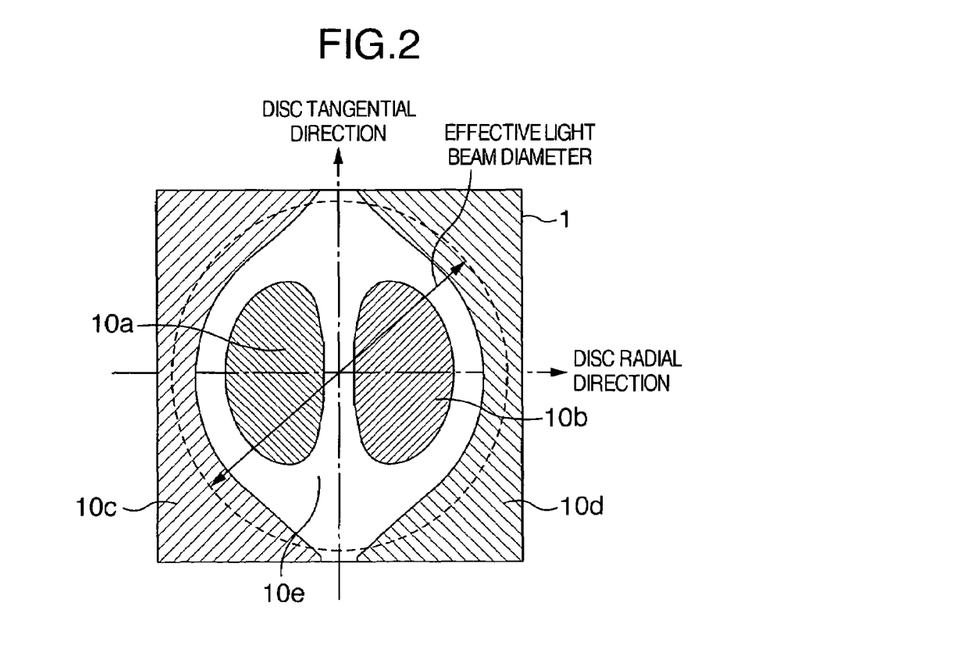
FIG. 2 is a diagram showing a schematical plan view of an electrode pattern example of one prior art coma aberration correction device.

Specifically, the above-cited JP-A-11-110802 discloses therein a configuration of an LC aberration correction device, which includes transparent electrodes 10a-10e each having a predefined shape on the surface of an LC element 1 as shown in FIG. 2—this diagram shows an exemplary electrode pattern of prior art coma aberration correction device—for the purpose of correcting coma aberration which is a wavefront aberration that appreciably affects the optical performance of an optical pickup.

Unfortunately, this aberration corrector device is faced with two major serious technical problems which follow.

An explanation will first be given of the first problem. In the prior art aberration corrector device, the light beam that is successfully correctable in its wavefront aberration is limited to a single kind. This can be said because the transparent electrodes disposed on the surface of LC element are usually designed in shape and size in such a way as to obtain the optimum aberration correction performance for the light beam having a predetermined effective beam diameter. Adversely this means that regarding a light beam having an effective beam diameter different from the effective beam diameter, its aberration correctability becomes extremely impaired even when performing aberration correction by an aberration correction device identical to the corrector device.

See Table 1 below, which shows a comparative example of the aberration correction factor per design condition in prior art coma aberration correction device.

TABLE 1

|  |  | Aberration Correction Factor (%) for DVD Light Beam Diameter of 2.0 mmΦ | Aberration Correction Factor (%) for CD Light Beam Diameter of 1.6 mmΦ |
|---|---|---|---|
| Design Conditions | Case A | 61.3 | 18.7 |
|  | Case B | 11.3 | 61.3 |
|  | Case C | 28.7 | 30.7 |

In the table above, the aberration correction factor, Fc, is defined as follows:

$$Fc = (Ai - Ar)/Ai \times 100 (\%),$$

where, $Ai$ is the initial aberration amount in route mean square (rms) value, and $Ar$ is the residual aberration after correction in rms value. In Case A of Table 1, system design was made to achieve the best possible aberration correction factor with respect to a digital versatile disc (DVD)-use light beam having its effective diameter of 2.0 mmΦ. In Case B, design was made to attain the best aberration correction factor relative to a compact disc (CD)-use light beam with an effective diameter of 1.6 mmΦ. In Case C, design was done to get the best aberration correction factor for a light beam having its effective diameter of an intermediate value between those of the DVD beam and the CD beam—e.g., 1.8 mmΦ.

For example, Table 1 above indicates an exemplary coma aberration performance difference occurring due to a difference in effective beam diameter. The aberration correction device as used herein is a prevailing coma aberration corrector device of the LC type having the transparent electrode pattern shown in FIG. 2 as taught from JP-A-11-110802. Additionally the aberration correction factor as indicated in Table 1 is the ratio of an amount of coma aberration removed by the aberration corrector to the prespecified initial (prior to correction) coma aberration, which is an effective parameter for evaluation of the aberration correction performance.

In Case A of Table 1 an LC aberration correction device is used which is under optimum design of transparent electrode shapes and sizes in such a way as to maximize the aberration correction factor relative to a DVD read light beam having an effective beam diameter of about 2.0 mmΦ and a wavelength of 658 nm. As apparent from this table, in this case, the aberration correction factor of more than 60% is attainable for the DVD-use light beam. However, when coma aberration correction is carried out by the same aberration corrector device for a CD read light beam having its effective beam diameter of about 1.6 mmΦ and wavelength of 785 nm, the resulting aberration correction factor is as low as about 11%.

Adversely, as shown in Case B in Table 1, the use of an LC aberration corrector device with the transparent electrode shapes and sizes being optimally designed to permit the aberration correction factor to become maximal (about 60% or more) relative to the CD-use light beam would also result in achievement of a mere aberration correction factor of about 11% for the DVD light beam in this case.

When optimally designing the transparent electrode shapes and sizes of the aberration corrector device to ensure that the aberration correction factor becomes maximized relative to a light beam having its effective beam diameter of 1.8 mmΦ, which is an intermediate value between that of the DVD light beam (2.0 mmΦ) and the CD light beam (1.6 mmΦ) as shown in Case C of Table 1, the resultant aberration correction factor stays as low as about 30% for both of the DVD and CD light beams.

It is thus apparent that in the above-noted prior art aberration correction device, even when performing the optimum design of transparent electrodes in any possible way, it is impossible to achieve the optimum solution capable of obtaining excellent aberration correction performances for both of the two light beams that are different in effective beam diameter from each other.

In recent years, in order to enable either a single optical pickup or an optical information reproduction apparatus to perform playback of a plurality of types of optical discs, optical pickup modules become into wide use, which are arranged to permit multiple kinds of light beams different in wavelength and effective beam diameter from one another to travel in substantially the same optical path. In this type of optical pickups, it is evidently advantageous, in viewpoints of the size of the optical pickup per se and the number of components and the cost, to provide the capability of successfully correcting all possible wavefront aberrations of every light beam in the same aberration correction device, rather than an approach to disposing separate aberration corrector devices in units of respective light beams. However, as stated previously, the prior art fails to disclose the above-noted problems and any teachings as to the configuration capable of successfully correcting together wavefront aberrations of multiple kinds of light beams different in effective beam diameter from one another by use of a single aberration correction device.

The second technical problem will next be discussed. In addition to the above-noted first problem, the prior art aberration correction device suffers from a problem which follows: the creation of a relative position deviation or displacement between this aberration corrector device and a light beam falling thereonto would result in an appreciable decrease in aberration correcting performance.

Figure 3:
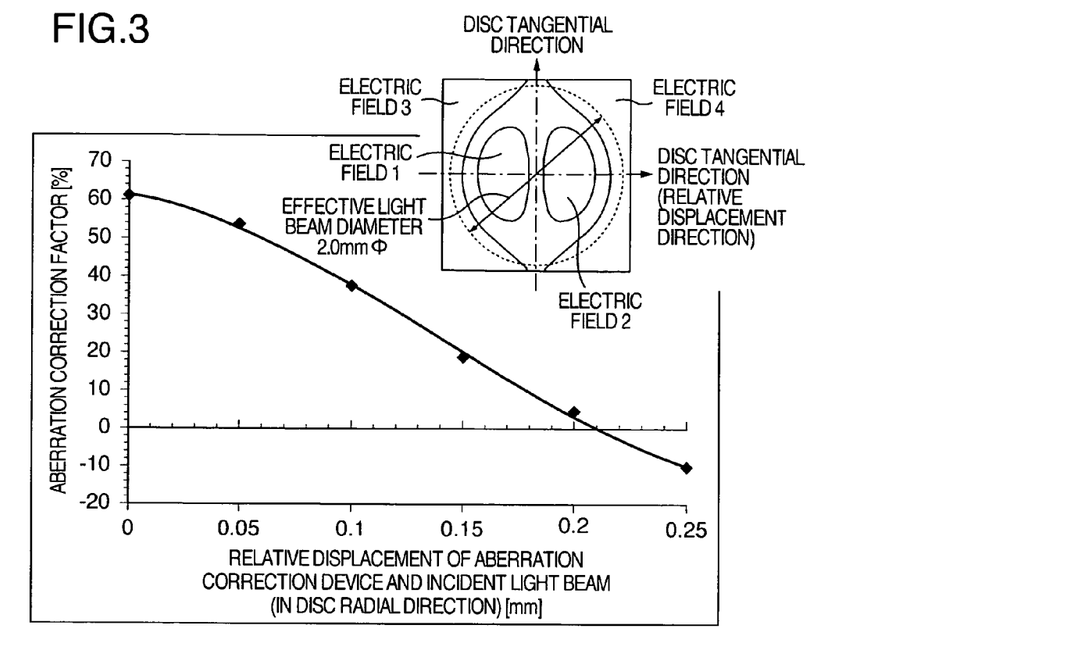
FIG. 3 is a diagram graphically showing the relationship of an incident light beam's relative position deviation and aberration correction factor in the prior art coma aberration correction device.

FIG. 3 is a graph showing, in case a prior art aberration correction device having the known standard transparent electrodes shown in FIG. 2 as one example showing the above-noted problems, a plot of the relationship of a relative displacement amount upon occurrence of the above-stated relative displacement between this aberration corrector device and its incident light beam versus an aberration correction factor in such event. Note that the results shown herein are the calculation results obtained in case fixation is done in a state that the best possible aberration correction performance is obtainable when the potential difference being applied to each electrode, i.e., phase difference, is such that a relative displacement is zeroed.

As apparent from this graph, when the relative displacement is zero, that is, when the incoming light beam falls onto the aberration corrector device without exhibiting any displacement, the best aberration correction performance (with the aberration correction factor of 60% or more) is obtainable, although the aberration correction performance rapidly drops down with an increase in relative displacement: at the relative displacement of 0.2 mm, the aberration correction factor decreases to almost 0%.

In this way, with the prior art aberration correction device, its aberration correction performance can noticeably decrease even upon occurrence of a tiny relative displacement. However, in the actual optical pickup, it is unavoidable in any way that relative displacement of about several tens of μm occurs between the light beam and the aberration corrector device due to the presence of attachment position variations occurring during assembly of such pickup. Accordingly, whether superior aberration correction performance is achievable even in the presence of such relative displacement is an important issue which affects the optical pickup's performances.

However, the prior art discloses neither the above-noted problems nor effective means for avoiding the reduction of aberration correction performance occurring due to relative displacement.

SUMMARY OF THE INVENTION

It is therefore an object of this invention to provide an optical pickup with increased usability and an optical information reproduction apparatus using the pickup.

The foregoing object is attainable by the invention as claimed.

According to the invention, it is possible to provide an improved optical pickup with increased usability and an optical information reproduction apparatus using the pickup.

DETAILED DESCRIPTION OF THE INVENTION

Embodiments of the present invention will be set forth below.

Embodiment 1

Figure 1:
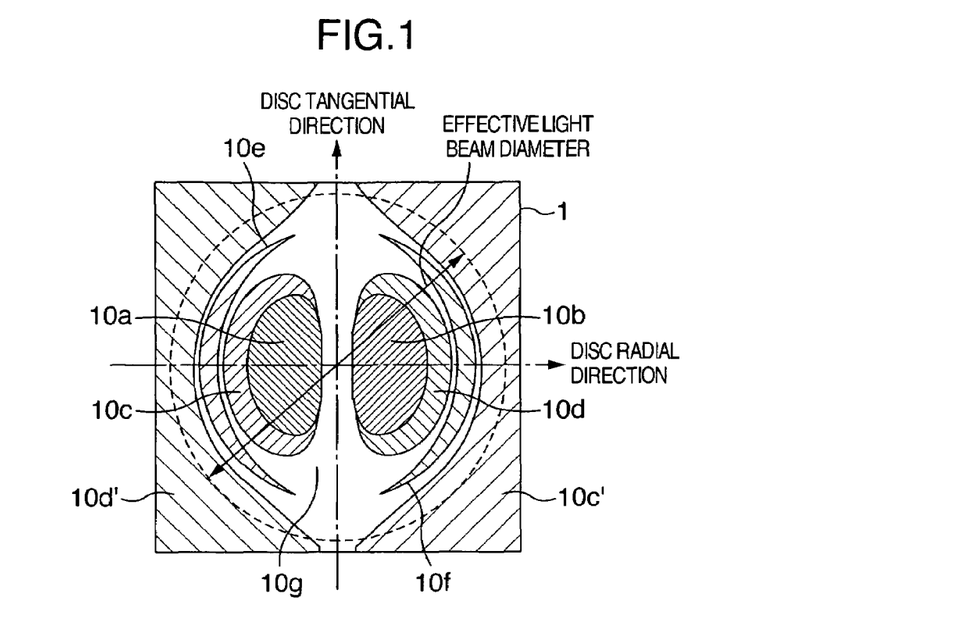
FIG. 1 is a diagram schematically showing a plan view of an exemplary electrode pattern of a coma aberration correction device embodying the invention.

An embodiment 1 of this invention will be described with reference to FIG. 1, which shows an exemplary electrode pattern of a coma aberration correction device embodying the invention. Although the aberration corrector device of this embodiment is also arranged so that a predetermined electrode plane is provided in the form of interposing a liquid crystal (LC) element in a similar way to the prior art aberration corrector device, FIG. 1 is a diagram schematically showing a plan view of one example of each electrode pattern as provided on such the electrode plane. Note that in this diagram, its lateral axis direction corresponds to a radial direction of an optical disc whereas the vertical axis direction is equivalent to a tangential direction of the disc, wherein the electrode pattern as shown herein has its function of correcting coma aberration occurring in the lateral axis direction, i.e., the disc radial direction.

As shown in FIG. 1, transparent electrodes 10a and 10b of substantially an elliptical shape are disposed in close proximity to a central portion of an electrode plane 1 of a liquid crystal (LC) element so that these are in line symmetry with a longitudinal axis. In addition, generally arc-shaped transparent electrodes 10c and 10d are disposed outside of the transparent electrodes 10a-10b to wrap them. Further outside thereof are disposed falcate transparent electrodes 10e and 10f at a fixed spatial distance therefrom. An outside region of these electrodes 10e-10f is covered, at its most part, with transparent electrodes 10c' and 10d' while retaining a constant gap space. Although not specifically depicted in FIG. 1, the electrodes 10c and 10c' are coupled together, resulting in the same potential difference being applied thereto at all times. Similarly the electrodes 10d and 10d' are tied together for being applied the same potential difference. The remaining portions of the electrode plane 1 other than the electrodes 10a-10f and 10c'-10d' (i.e., those areas with no hatching in FIG. 1) are entirely covered with a transparent electrode 10g for giving thereto a reference voltage potential.

With the LC type aberration correction device having the plurality of electrodes disposed in the way stated above, when applying a predefined potential difference to each electrode in accordance with the wavelength, coma aberration amount and effective beam diameter of a light beam falling onto this aberration correction device, it is possible to obtain the optimum aberration correction effect on a per-beam basis. Note here that the potential difference as given to each electrode at this time refers to a difference between a voltage being applied to the electrode 10g for use as the reference and a voltage applied to each electrode. Upon occurrence of such potential difference between the electrode 10g and each electrode, the light beam passing through each transparent electrode portion experiences creation of a delay or an advance of local phase (wave surface or wavefront). This local wavefront advancing cancels out this light beam's inherent wavefront aberration equivalent to coma aberration due to delay, thereby realizing the intended aberration correction.

Table 2 below shows actual examples of the coma aberration correction performance and the relative phase difference added to each electrode penetration light in the coma aberration correction device embodying the invention.

TABLE 2

| Electrode | | In Case of Coma Aberration Correction for DVD Light Beam ($\lambda$ = 658 nm, De = 2.0 mm$\Phi$) | In Case of Coma Aberration Correction for CD Light Beam ($\lambda$ = 785 nm, De = 1.6 mm$\Phi$) |
|---|---|---|---|
| Phase Difference Added (nm) | 10a | +8.49 | +9.44 |
| | 10b | −8.49 | −9.44 |
| | 10c, 10c' | +8.18 | +1.23 |
| | 10d, 10d' | −8.18 | −1.23 |
| | 10e | −0.21 | −10.13 |
| | 10f | +0.21 | +10.13 |
| Aberration Correction Factor (%) | | 61.1 | 60.9 |

Note that in Table 2, the shapes and layout positions of respective electrodes are identical to those shown in FIG. 1. The phase difference is the one that is added to each electrode portion pass-through light beam for optimum correction of the coma aberration of 0.01 $\lambda$rms. In other words, the phase difference is a relative phase difference which is added to the wavefront of a light beam passing through each electrode region while regarding as a reference phase the phase of a wavefront being given to a light beam penetrating the electrode portion 10g of FIG. 1 upon application of the reference voltage applied to the electrode 10g. The aberration correction factor, Fc, is defined by:

$$Fc=(Ai-Ar)/Ai\times 100(\%),$$

where, Ai is the initial aberration (rms value), Ar is the residual aberration after correction (rms value).

More specifically, Table 2 indicates, as an example for demonstration of the effect of the above-noted coma aberration correction, a phase difference to be added to the wavefront of a light beam passing through each electrode portion in the case of performing the optimum aberration correction by causing a DVD-use light beam ($\lambda$=658 nm, effective beam diameter De is 2.0 mm$\Phi$) and a CD-use light beam ($\lambda$=785 nm, De=1.6 mm$\Phi$) each experiencing the occurrence of coma aberration equivalent to 0.01$\lambda$ ($\lambda$ is the wavelength of each light beam) in RMS value to pass through the aberration correction device in this embodiment (i.e., a relative phase difference in case the wavefront phase of a light beam passing through the electrode 10g portion with the reference voltage applied thereto is regarded as the reference phase) along with actual examples of the aberration correction factor Fc in case such phase difference is added to the light beam passing through each electrode portion. As apparent from Table 2, by using the aberration correction device having the electrode pattern shown in FIG. 1 and applying a prespecified voltage to each electrode in such a way that an additive phase difference is added to the light beam passing through each electrode part, it is possible even by use of the same aberration corrector device to obtain the aberration correction factor that is as high as 60% or more for both the DVD light beam and the CD light beam, which are different in wavelength $\lambda$ and effective beam diameter De from each other. This an important advantage which has not been achievable by prior art aberration correction devices.

Note here that the phase difference to be added to each electrode penetration light shown in Table 2 indicates a phase difference per se upon optimum correction of coma aberration equivalent to 0.01$\lambda$ in RMS value. Usually this additive phase difference is simply in proportion to a correctable coma aberration amount. Accordingly, when correcting the coma aberration with its RMS value of more than 0.01λ, the additive phase difference may be set to a result of the multiplication of a magnification obtained by subtraction of a target coma aberration count (RMS value) by 0.01λ.

Also note that although in Table 2 an example which has realized the commonization of a DVD light beam and CD light beam that are different in effective beam diameter from each other was shown as one embodiment of the aberration correction device of this invention, it is obvious that this embodiment should not be limited to this combination only. This embodiment is also applicable in identically the same way to aberration correction devices which are built in optical pickup modules capable of recording and reproducing information to and from ultrahigh-density recordable optical discs under rapid growth of development in recent years, such as for example "Blue-ray" or "HD-DVD" media and which have an ability to perform aberration correction in common for both a light beam that writes and reads data to and from such ultrahigh-density optical discs and the traditional DVD/CD-use light beams.

Embodiment 2

A second embodiment of this invention will be described with reference to FIGS. 4 and 5. When actually incorporating an aberration correction device into an optical pickup, it sometimes happens that relative position deviation or displacement takes place between the aberration corrector device and a light beam as guided to enter this device due to the presence of several factors, such as the accuracy of its constituent components and variations during assembly. However, as shown by the above-stated example of FIG. 3, the prior art aberration corrector device is such that the aberration correction factor—i.e., this aberration corrector device's own aberration correction performance—drastically decreases due to such relative displacement. Even in this case also, by using this embodiment and adjusting the voltage being applied to each electrode in accordance with a relative displacement amount and also controlling at a prespecified value a relative phase difference being added to the wavefront of a light beam passing through each electrode portion, it is possible to successfully suppress unwanted reduction of the aberration correction factor relative to the above-noted relative displacement of incident light beam.

Figure 4:
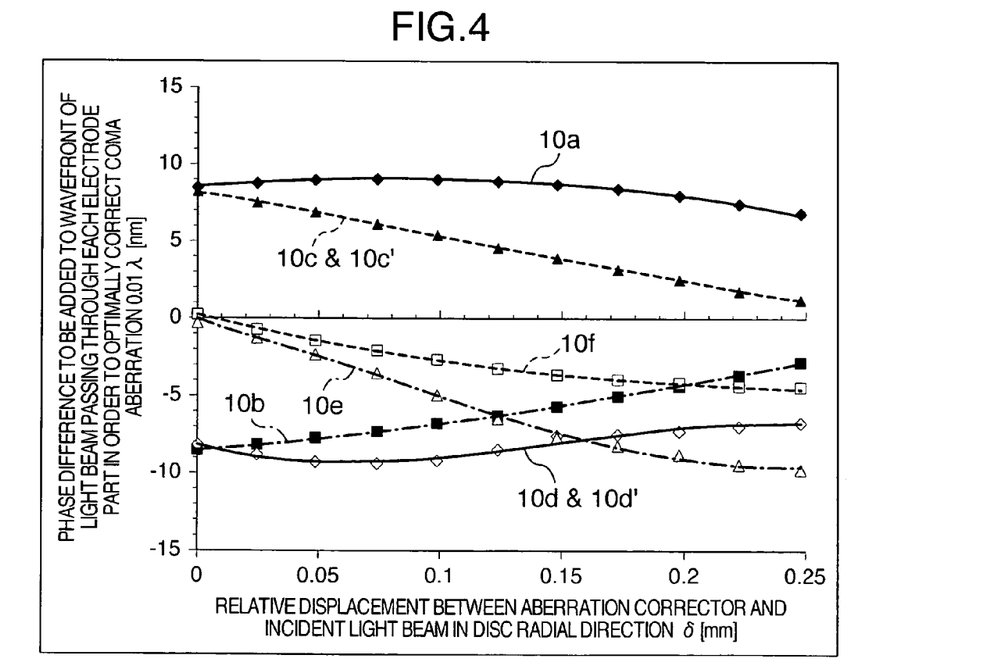
FIG. 4 is a graph showing an exemplary relation of a relative position deviation of an incident light beam in the coma aberration correction device of the illustrative embodiment and a relative phase difference to be added to each electrode portion penetration light beam in order to perform optimum aberration correction of a coma aberration amount, 0.01 λrms, in each case.

For example, FIG. 4 is a graph showing several curves of a relative phase difference being added to a light beam passing through each electrode portion in order to optimally correct a coma aberration 0.01 λrms in each case versus a relative displacement δ between the aberration correction device and its incident light beam under an assumption that a center point of the aberration corrector device and an incidence position of the center light axis of an incoming DVD-use light beam give rise to relative displacement by δ in a direction (horizontal direction of FIG. 1) equivalent to a disc radial direction upon execution of coma aberration correction of a DVD-use light beam (wavelength λ=658 nm, effective beam diameter De is 2.0 mmΦ) by the aberration correction device of this embodiment having the electrode pattern shown in FIG. 1.

Figure 5:
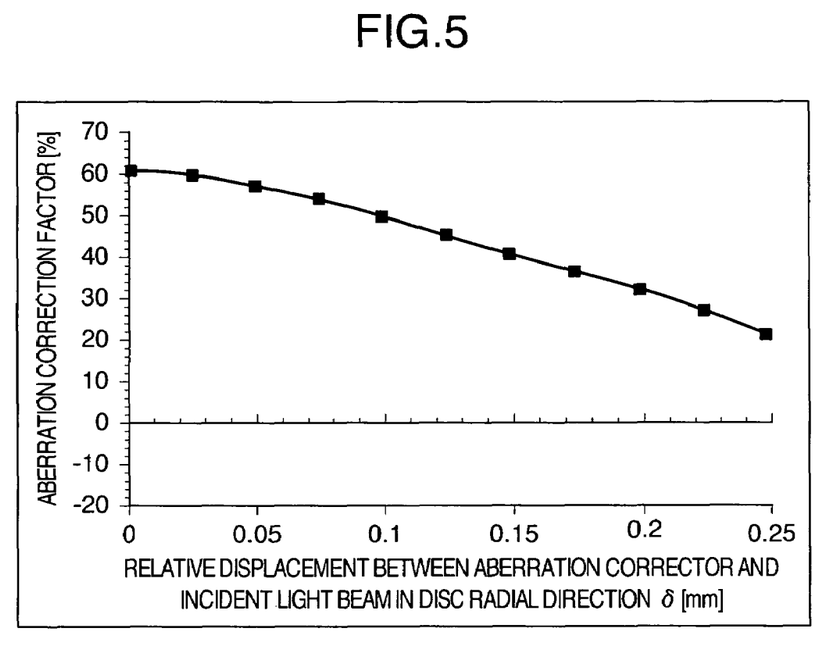
FIG. 5 is a graph showing a relation between relative position deviation of an incident light beam in the coma aberration correction device of this embodiment and an aberration correction factor with the optimum aberration correction applied thereto in each case.

Additionally, FIG. 5 is a graph showing a curve of aberration correction factor at the time of the optimum aberration correction versus relative displacement δ between the aberration correction device and its incoming DVD light beam in a similar way to FIG. 4.

As apparent from FIGS. 4 and 5, by using the aberration corrector device having the electrode pattern of this embodiment and controlling the voltage as given to each electrode in accordance with a relative displacement amount of a light beam falling onto this aberration corrector device to thereby set at a predetermined value the relative phase difference to be added to the light beam passing through each electrode part, the reduction of the aberration correction performance relative to the incident light's relative displacement is noticeably improved when compared to the case of using the prior art aberration correction device shown in FIG. 3.

Note that the phase difference to be added to each electrode penetration light shown in FIG. 4 indicates a phase difference per se upon optimum correction of coma aberration equivalent to 0.01λ in RMS value as in the case of Table 2. Generally, this additive phase difference is simply in proportion to a correctable coma aberration amount. Accordingly, when correcting the coma aberration with its RMS value of more than 0.01λ, the additive phase difference may be set to a result of the multiplication of a magnification obtained by subtraction of a target coma aberration count (RMS value) by 0.01λ.

Also note that although the examples of FIGS. 4 and 5 are of the case where the incident light beam of the aberration correction device is offset in position in the direction corresponding to the disc radial direction (i.e., horizontal direction of FIG. 1), it would readily occur to a skilled person that even upon occurrence of displacement in a direction equivalent to the disc track's tangential direction (vertical direction in FIG. 1), the reduction of the aberration correction performance against the above-noted displacement is extremely improvable by controlling the potential being applied to each electrode part in accordance with the amount of such displacement and setting to a predefined value the relative phase difference being added to the light beam passing through each electrode part. In other words, even when the incident light beam gives rise to a position offset in any direction within the electrode plane of the aberration corrector device, it is possible by controlling in deference thereto the relative phase difference being added to the light beam passing through each electrode part to stay at the predefined value, to suppress or minimize reduction of the aberration correction performance occurring due to the relative displacement of the incident light beam.

Embodiment 3

Figure 6:
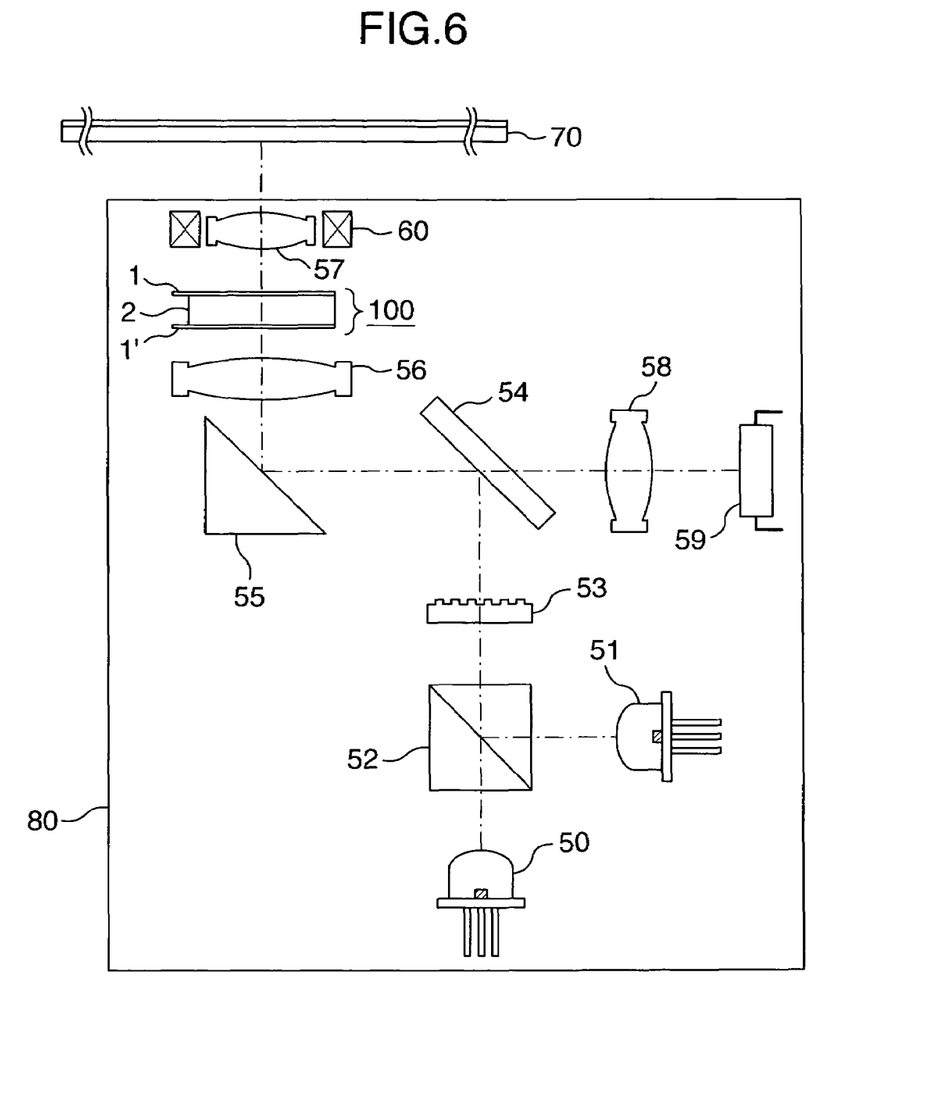
FIG. 6 is a diagram schematically showing a configuration of one embodiment of an optical pickup with the coma aberration correction device of the embodiment being built therein.

Referring to FIG. 6, one example is shown of an optical pickup mounting therein the aberration correction device as described in the first and second embodiments.

Within an optical system 80 of the pickup as surrounded by solid lines in FIG. 6, a semiconductor laser light source 50 for outward irradiation of a beam of DVD-use laser light having a wavelength of from 650 to 660 nm and a semiconductor laser light source 51 for emission of a beam of CD-use laser light having its wavelength in a range of 780 to 790 nm are disposed. These laser beams as emitted from respective semiconductor laser light sources are combined together by a light beam-combining prism 52 into the same light path and then guided to enter a half mirror 54, also known as "semi-transparent" mirror, through a diffraction grating 53. Each laser beam reflected from the half mirror 54 travels via a rise-up mirror 55 to reach a coupling lens 56. By this coupler lens 56, the beam is converted into a substantially parallel light beam, which progresses toward an objective lens 57. Then, the beam is collected by this objective lens 57 onto a predetermined type of optical disc 70 at a recording track thereon. Next, a backward or "homeward" light beam that was reflected off from the optical disc 70 travels in the opposite direction along the light path of the forward or "outward" light and returns to the half mirror 54 by way of the objective lens 57, coupler lens 56 and riseup mirror 55. Part of the backward light that penetrated this half mirror 54 passes through a detection lens 58 to reach a photodetector 59, at which are detected an information signal and an objective lens control signal, such focus error signal, a tracking error signal or the like. This objective lens control signal is fed back via a control circuit (not shown) to a two-dimensional actuator 60 with the objective lens 57 being coupled thereto so that position control of the objective lens is performed.

It is noted that the configuration of the optical pickup optics 80 is an ordinary one, so its detailed explanation is eliminated herein.

In the optical pickup with the above-stated arrangement, this embodiment's aberration correction device 100 is disposed in a light path between the coupler lens 56 and the objective lens 57 as shown in FIG. 6 by way of example, for permitting each of the DVD and CD-use laser light beams to enter in the state of an almost parallel beam. The aberration corrector device 100 is arranged so that a liquid crystal (LC) element 2 is interposed between electrode plates 1 and 1', thereby performing optimum aberration correction relative to each light beam by using a voltage applying device (not shown) to apply a predetermined voltage potential to certain one of the respective electrode planes in the way stated supra. Regarding the voltage applying device and the applying means for applying the voltage to the electrode planes 1 and 1', these are disclosed in detail in the above-cited JP-A-11-110802 and are within the scope of the prior art, so explanations thereof are omitted herein.

Although the embodiment of FIG. 6 was discussed while taking as an example the compatible optical pickup with supportability to the read and/or write of the both types of optical discs, i.e., DVD and CD, it will be appreciated that this should not be construed as limiting the invention. For example, the aberration correction device of this embodiment is also adaptable for use in a compatible optical pickup with supportability to the recording/playback of the above-stated ultrahigh-density recording optical disks, such as "Blu-ray" and "HD-DVD" discs and supportability to the read or write of DVD and/or CD.

By the above-stated pickup embodying the invention and an optical information reproduction apparatus using this pickup, it is possible to obtain superior aberration correction performances relative to a plurality of effective beam diameter-different light beams and, moreover, obtain excellent aberration correction performances even upon occurrence of relative positional deviation between an incident light beam and the aberration correction device.

Although the embodiments of this invention as described using FIG. 1 and Table 2 are specifically drawn to the case of correcting coma aberrations occurring in the disc's radial direction (horizontal direction of FIG. 1), the pickup can sometimes experience the occurrence of a coma aberration in the disc's tangential direction (vertical direction in FIG. 1). Additionally, for coma aberrations occurrable in any given directions other than the radial and tangential directions, superior aberration correction is executable irrespective of such generation directions by decomposing the coma aberration into a disc radial direction component and a tangential direction component and then properly correcting respective components. In this regard, it is more preferable for the optical pickup to mount therein a specific type of aberration correction device capable of performing coma aberration correction in relation to the two direction of the disc radial direction and the tangential direction in a way independent of each other.

Incidentally, in order to enable a single aberration correction device to implement the coma aberration correction relating to the two directions at right angles to each other, an aberration correction device is employable which is arranged to further include a second electrode plane having an electrode layout with each transparent electrode pattern shown in FIG. 1 being rotated about the center axis by an angle of 90 degrees, wherein this second electrode plane and the first electrode plane shown in FIG. 1 are designed to interpose the LC element therebetween.

The above-noted aberration correction device with the two-direction supportability is such that its electrodes for independent voltage application increase in number up to almost twice those in the embodiment of FIG. 1. In such case, corresponding electrodes—e.g., the electrodes 10a and 10f, or 10b and 10e—in the embodiment of FIG. 1 are wired together to enable the same voltage to be applied thereto. With this approach, it is possible to reduce the required number of those electrodes for independent voltage application. If this is the case, it is possible to retain noticeably enhanced coma aberration correction performance when compared to the prior art aberration correction device, although the resultant aberration correction performance is somewhat made lower than that in the case of a proper voltage being applied to each electrode as in the inherent embodiments.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical pickup comprising:
   a plurality of laser light sources, different in a light flux diameter from each other;
   an objective lens for collecting light of said plurality of laser light sources onto an optical recording medium; and
   aberration correction means disposed between said laser light sources and said objective lens for correcting aberration relative to light from said laser light sources;
   wherein a plurality of electrode patterns, corresponding to differences of said light flux diameter from said laser light sources, are disposed on a single plane for pass-through of said light within said aberration correction means.

2. The optical pickup according to claim 1, wherein at least six electrodes are disposed on the single plane of said aberration correction means.

3. An optical information reproduction apparatus comprising control means for controlling the optical pickup as recited in claim 2.

4. An optical pickup comprising:
   a first laser light source;
   a second laser light source less in light flux diameter than said first laser light source;
   an objective lens for correcting light of the first and second laser light sources onto an optical recording medium; and
   aberration correction means for correcting coma aberration of said first and second laser light sources;
   wherein a first electrode pattern for enabling correction of aberration relative to light from said first laser light source and a second electrode pattern for enabling coma aberration correction for light from said second laser light source are disposed on a single plane for pass-through of said light within said aberration correction means.

5. An aberration correction device comprising:
aberration correction means disposed between a laser light source and an objective lens for correction of a light beam emitted from the laser light source onto an optical recording medium, for correcting a wavefront difference of the light beam occurring due to aberration relative to light from said laser light source;
a plurality of electrodes provided to apply a potential difference at each of prespecified positions on a predefined single plane for pass-through of said light beam within said aberration correction means; and
means for controlling, with respect to more than two light rays passing through said aberration correction device and being different in light flux diameter from each other, a potential difference being applied to each said electrode in units of said light rays in such a way as to correct a wavefront aberration of each said light ray.

6. The aberration correction device according to claim 5, further comprising:
means for mainly correcting at least coma aberration among wavefront aberrations of each said light ray.

7. The aberration correction device according to claim 6, wherein at least more than six independent electrodes are disposed in a way substantially axial symmetrical to a predetermined axis almost extending through a center point in the single plane on which these electrodes are disposed.

8. The aberration correction device according to claim 6, wherein said aberration correction means includes a liquid crystal element for changing refractivity in response to a voltage as applied to each said electrode and for giving, due to the refractivity change, a local phase difference to a light beam passing through said aberration correction means to thereby correct a prespecified wavefront aberration.

9. The aberration correction device according to claim 5, wherein at least more than six independent electrodes are disposed in a way substantially axial symmetrical to a predetermined axis almost extending through a center point in the single plane on which these electrodes are disposed.

10. The aberration correction device according to claim 9, wherein said aberration correction means includes a liquid crystal element for changing refractivity in response to a voltage as applied to each said electrode and for giving, due to the refractivity change, a local phase difference to a light beam passing through said aberration correction means to thereby correct a prespecified wavefront aberration.

11. The aberration correction device according to claim 5, wherein said aberration correction means includes a liquid crystal element for changing refractivity in response to a voltage as applied to each said electrode and for giving, due to the refractivity change, a local phase difference to a light beam passing through said aberration correction means to thereby correct a prespecified wavefront aberration.

12. An aberration correction device comprising:
aberration correction means disposed between a laser light source and an objective lens for correction of a light beam emitted from the laser light source onto a certain optical information recording medium, for correcting a wavefront difference of the light beam occurring due to giving a prespecified phase difference to said light beam;
a plurality of electrodes provided to apply a potential difference at each of prespecified positions on a predefined plane for pass-through of said light beam within said aberration correction means; and
means for performing voltage application to each said electrode while independently controlling a potential difference being applied to each said electrode in accordance with an amount of wavefront aberration at least occurring at each light ray passing through the aberration correction means within said aberration correction device and an amount of relative position deviation between an incidence position of optical axis and a center point upon entry of each said light ray onto the electrode layout plane.

13. The aberration correction device according to claim 12, further comprising:
means for mainly correcting at least coma aberration among wavefront aberrations of each said light ray.

14. The aberration correction device according to claim 12, wherein at least more than six independent electrodes are disposed in a way substantially axial symmetrical to a predetermined axis almost extending through a center point in the plane on which these electrodes are disposed.

15. The aberration correction device according to claim 12, wherein said aberration correction means includes a liquid crystal element for changing refractivity in response to a voltage as applied to each said electrode and for giving, due to the refractivity change, a local phase difference to a light beam passing through said aberration correction means to thereby correct a prespecified wavefront aberration.

16. An optical pickup comprising:
one or more laser light sources, being different in a light flux diameter from each other;
an objective lens for collecting light leaving the one or more light sources onto an optical recording medium; and
an aberration correction device including:
aberration correction means disposed between the one or more laser light sources and the objective lens for correction of a light beam emitted from each laser light source onto the optical recording medium, for correcting a wavefront difference of the light beam occurring due to aberration relative to light from each laser light source,
a plurality of electrodes provided to apply a potential difference at each of prespecified positions on a predefined single plane for pass-through of said light beam within said aberration correction means, and
means for controlling, with respect to more than two light rays passing through said aberration correction device and being different in the light flux diameter from each other, a potential difference being applied to each said electrode in units of said light rays in such a way as to appropriately correct a wavefront aberration of each said light ray.

17. An optical pickup comprising:
at least one laser light source;
an objective lens for collecting light leaving the laser light source onto an optical recording medium; and
an aberration correction device including:
aberration correction means disposed between the laser light source and the objective lens for correction of a light beam emitted from the laser light source onto the optical recording medium, for correcting a wavefront difference of the light beam occurring due to giving a prespecified phase difference to said light beam,
a plurality of electrodes provided to apply a potential difference at each of prespecified positions on a predefined plane for pass-through of said light beam within said aberration correction means, and
means for performing voltage application to each said electrode while independently controlling a potential difference being applied to each said electrode in accordance with an amount of wavefront aberration at least occurring at each light ray passing through said aberration correction means within said aberration correction device and an amount of relative position deviation between an incidence position of optical axis and a center point upon entry of each said light ray onto an electrode layout plane.

18. An optical pickup comprising:
at least one laser light source;
an objective lens for collecting light leaving the laser light source onto an optical recording medium; and
an aberration correction device including:
   aberration correction means disposed between the laser light source and the objective lens for correction of a light beam emitted from the laser light source onto a the optical recording medium, for correcting a wavefront difference of the light beam occurring due to giving a prespecified phase difference to said light beam,
   a plurality of electrodes provided to apply a potential difference at each of prespecified positions on a predefined plane for pass-through of said light beam within said aberration correction means,
   means for performing voltage application to each said electrode while independently controlling a potential difference being applied to each said electrode in accordance with an amount of wavefront aberration at least occurring at each light ray passing through said aberration correction means within said aberration correction device and an amount of relative position deviation between an incidence position of optical axis and a center point upon entry of each said light ray onto an electrode layout plane, and
   means for mainly correcting at least coma aberration among wavefront aberrations of each said light ray.

19. An optical pickup comprising:
at least one laser light source;
an objective lens for collecting light leaving the laser light source onto an optical recording medium; and
an aberration correction device including:
   aberration correction means disposed between the laser light source and the objective lens for correction of a light beam emitted from the laser light source onto the optical recording medium, for correcting a wavefront difference of the light beam occurring due to giving a prespecified phase difference to said light beam,
   a plurality of electrodes provided to apply a potential difference at each of prespecified positions on a predefined plane for pass-through of said light beam within said aberration correction means,
   means for performing voltage application to each said electrode while independently controlling a potential difference being applied to each said electrode in accordance with an amount of wavefront aberration at least occurring at each light ray passing through said aberration correction means within said aberration correction device and an amount of relative position deviation between an incidence position of optical axis and a center point upon entry of each said light ray onto an electrode layout plane,
   means for mainly correcting at least coma aberration among wavefront aberrations of each said light ray,
wherein said aberration correction device is arranged so that at least more than six independent electrodes are disposed in a way substantially axial symmetrical to a predetermined axis almost extending through the center point in the electrode layout plane on which these electrodes are disposed.

20. An optical pickup comprising:
at least one laser light source;
an objective lens for collecting light leaving the laser light source onto an optical recording medium; and
an aberration correction device including:
   aberration correction means disposed between the laser light source and the objective lens for correction of a light beam emitted from the laser light source onto a the optical recording medium, for correcting a wavefront difference of the light beam occurring due to giving a prespecified phase difference to said light beam,
   a plurality of electrodes provided to apply a potential difference at each of prespecified positions on a predefined plane for pass-through of said light beam within said aberration correction means,
   means for performing voltage application to each said electrode while independently controlling a potential difference being applied to each said electrode in accordance with an amount of wavefront aberration at least occurring at each light ray passing through said aberration correction means within said aberration correction device and an amount of relative position deviation between an incidence position of optical axis and a center point upon entry of each said light ray onto an electrode layout plane, and
   means for mainly correcting at least coma aberration among wavefront aberrations of each said light ray,
wherein said aberration correction device is arranged so that at least more than six independent electrodes are disposed in a way substantially axial symmetrical to a predetermined axis almost extending through the center point in the electrode layout plane on which these electrodes are disposed, and
wherein said aberration correction means includes a liquid crystal element for changing refractivity in response to a voltage as applied to each said electrode and for giving, due to the refractivity change, a local phase difference to a light beam passing through said aberration correction means to thereby correct a prespecified wavefront aberration.

* * * * *